Nov. 16, 1926.
J. A. ROCHIN
1,607,136
RAIL JOINT
Filed May 22, 1926
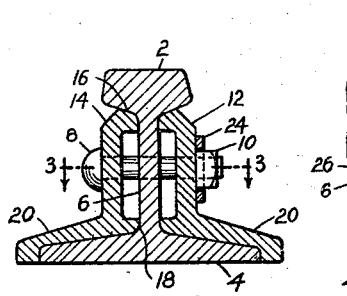
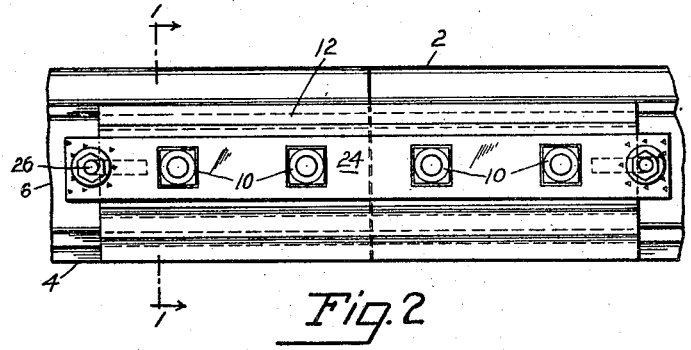
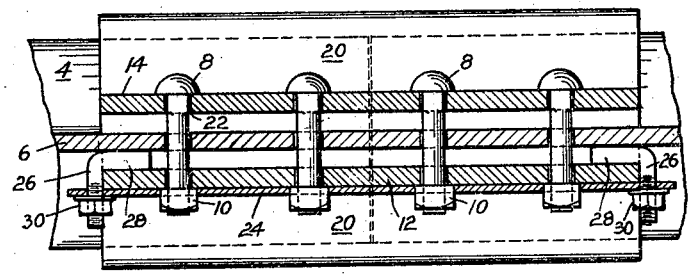
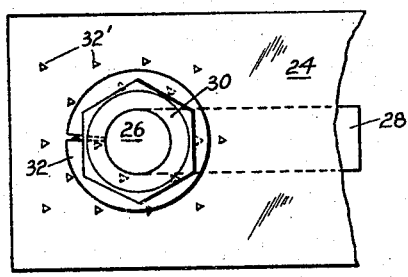
INVENTOR.
Joseph A. Rochin
BY M. C. Frank
ATTORNEY.

Patented Nov. 16, 1926.

1,607,136

UNITED STATES PATENT OFFICE.

JOSEPH A. ROCHIN, OF LIVERMORE, CALIFORNIA.

RAIL JOINT.

Application filed May 22, 1926. Serial No. 110,906.

My invention relates to a means for securing rails together, and more particularly, but not exclusively, to an improved fish plate and nut lock assembly for railroad rail joints.

The objects of my invention are to provide a joint of enhanced and more permanent holding power; to provide an improved fish plate construction; to provide a structure which maintains the tightness of the holding bolts; to provide a structure which maintains the bolts in tension in spite of stretching; to provide improved means for preventing the nuts from backing off the bolts; and to provide said last-included means with the characteristics of simplicity, ease of application, reliability, and holding power not prejudicing the strength of the parts to which it is applied.

Together with the above features of advantage, other objects of invention will be set forth at length in the following description.

Referring to the drawings:

Figure 1 is a transverse vertical section of the rail joint of my invention. The plane of section is indicated by the line 1—1 in Fig. 2.

Fig. 2 is a side elevation of the assembled joint.

Fig. 3 is a longitudinal horizontal section of the rail joint; the plane of section being indicated by the 3—3 in Fig. 1.

Fig. 4 is a detail elevation of the connection of the locking plate to its holding hook.

The embodiment of my invention which I illustrate herewith is applied to the union of a pair of railroad rails, having a rolling surface 2, a broad base 4, and a connecting web 6 apertured to receive the usual holding bolts 8. The holding bolts are supplied with holding nuts 10 to clamp the rails between fish plates 12 and 14.

The fish plates 12 and 14 are essentially of channel section approximately the width of the rail web 6. The upper edge is beveled at 16 to present a holding face complementary to that of the rail, and the lower edge is similarly formed at 18, and is provided with an extending flange 20 shaped to encompass and grip the base 4, of the rail. The fish plates are apertured to receive the holding bolts 8, and the apertures in at least one of the plates should be squared to hold the squared portion 22 of the bolt shanks from turning. It will be understood however, that other means may be employed to hold the bolts against rotation, as this presents no very serious difficulty.

Means are provided for preventing the holding nuts 10 from backing off the bolts. A locking plate 24 is formed with a plurality of angular openings therein, constituted as square apertures, formed to non-rotatively receive the holding nuts 10.

Means are provided to retain this locking plate 24 in operative position over the nuts to prevent their rotation. The plate is apertured near its ends to receive the threaded portion of the screw hooks 26. The unthreaded leg 28 of each hook, is shaped and sized to fit into the hollow formed between the rail and its channelled fish plate. A nut 30 holds the plate to the hook and secures the assembly in position. Preferably the plate is roughened immediately surrounding the end apertures by struck-up portions 32' or their equivalents to offer additional frictional interference to any turning movement of the lock-washer 32, provided to hold the nut 30 from backing off. While a simple locking means such as the washer 32, is effective to hold the locking plate in position, it would be ineffectual if applied to the main holding nuts 10, because these holding nuts are subjected to actual working stresses, whereas the nuts 30 holding the locking plate in position are not subjected thus to "working". This distinction is important. It should also be noted that there is no factor of the construction of this locking means tending to weaken the rail, the fish plates, or the nuts and bolts securing them together. Moreover this unitary locking means balances the torques of the several nuts and does not transmit the tendency to turn, to the nuts which hold the locking plate in position.

Both fish plates are illustrated as identical, but certain objects of my invention could be accomplished by using one standard fish plate in combination with one channelled plate. The use of two channelled fish plates, however, emphasizes the advantage which the resilience of each fish plate produces, that is, the advantage of resiliently resisting bolt tension, and thereby tending to prevent over-tension and compensating for the slight stretching of the bolts which unavoidably occurs.

It will be understood that the lessons taught by this invention suggest modifications within its scope; and though but one specific embodiment of the invention has been described herein, it is desired that the invention not be limited thereto other than as prescribed by the appended claims.

I claim:

1. A rail joint comprising a pair of channelled fish plates for opposite sides of the abutting rails, each plate having apertures therein adapted to align with apertures in both rails, bolts for said apertures and nuts for said bolts, a locking plate having openings therethrough to non-rotatively receive the nuts, bolt hooks having one leg in the hollow formed between the rail and the channelled fish plate, nuts for said bolt-hooks to permit firmly clamping said locking plate said hooks and said fish plate together, and means to resist unscrewing the last-included nuts.

2. A rail joint comprising a pair of channelled fish plates for opposite sides of the abutting rails, each plate having apertures therein adapted to align with apertures in both rails, bolts for said apertures and nuts for said bolts, a locking plate having openings therethrough to non-rotatively receive the nuts, bolt hooks having one leg in the hollow formed between the rail and the channelled fish plate and having the other leg extending through apertures formed therefor in the locking plate, and nuts for securing the locking plate on said hooks.

3. In combination with a rail joint having a fish plate, nuts and bolts securing the abutting rails to the fish plate, and a locking plate apertured to non-rotatively receive said nuts; means for securing the locking plate in position comprising bolt-hooks having one leg adapted for insertion between the rail and fish plate, and nuts for securing the locking plate on said hooks.

In testimony whereof, I affix my signature.

JOSEPH A. ROCHIN.